US008260899B2

(12) United States Patent
Kandefer et al.

(10) Patent No.: US 8,260,899 B2
(45) Date of Patent: *Sep. 4, 2012

(54) NETWORK ATTACHED STORAGE SNMP SINGLE SYSTEM IMAGE

(75) Inventors: Florian K. Kandefer, Raleigh, NC (US); Sudhakar V. Chellam, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 338 days.

This patent is subject to a terminal disclaimer.

(21) Appl. No.: 12/192,836

(22) Filed: Aug. 15, 2008

(65) Prior Publication Data

US 2008/0301217 A1 Dec. 4, 2008

Related U.S. Application Data

(63) Continuation of application No. 10/143,149, filed on May 10, 2002, now Pat. No. 7,451,199.

(51) Int. Cl.
*G06F 15/173* (2006.01)
(52) U.S. Cl. ...................................... 709/223
(58) Field of Classification Search .................. 709/223
See application file for complete search history.

(56) References Cited

U.S. PATENT DOCUMENTS

| 5,185,860 | A |   | 2/1993 | Wu ................................ 395/200 |
| 5,561,769 | A |   | 10/1996 | Kumar et al. ............ 395/200.05 |
| 5,828,876 | A |   | 10/1998 | Fish et al. ..................... 395/601 |
| 5,832,224 | A | * | 11/1998 | Fehskens et al. ............. 709/223 |
| 5,944,779 | A |   | 8/1999 | Blum ............................ 709/201 |
| 6,047,323 | A |   | 4/2000 | Krause .......................... 709/227 |
| 6,055,599 | A |   | 4/2000 | Han et al. ...................... 710/132 |
| 6,085,237 | A |   | 7/2000 | Durham et al. ............... 709/221 |
| 6,192,034 | B1 |   | 2/2001 | Hsieh et al. ................... 370/241 |
| 6,199,109 | B1 |   | 3/2001 | Reder et al. ................... 709/224 |
| 6,539,422 | B1 | * | 3/2003 | Hunt et al. .................... 709/217 |
| 2002/0095368 | A1 | * | 7/2002 | Tran ............................... 705/37 |

FOREIGN PATENT DOCUMENTS

| WO | WO 01/26286 A1 | 4/2001 |
| WO | WO 02/079983 A3 | 10/2002 |

* cited by examiner

*Primary Examiner* — Larry Donaghue
(74) *Attorney, Agent, or Firm* — Ido Tuchman (57) ABSTRACT

A method, system, and apparatus for a management station to manage a node cluster in a computer network. Regardless which node in the node cluster receives a management command from the management station to the master node, the management command is sent to the master node. The master node prepares a command response and sends the response back to the original node that received the management command. The original node, in turn, forwards the command response to the management station. The invention utilizes management agents executing on a master node and servant nodes to create and process the command response.

18 Claims, 5 Drawing Sheets

NETWORK ATTACHED STORAGE SNMP SINGLE SYSTEM IMAGE

CROSS-REFERENCE TO RELATED APPLICATIONS

This application is a continuation under 35 U.S.C. §120 of U.S. patent application Ser. No. 10/143,149 titled "NETWORK ATTACHED STORAGE SNMP SINGLE SYSTEM IMAGE" and filed May 10, 2002, now U.S. Pat. No. 7,451,199, the entire text of which is specifically incorporated by reference herein.

FIELD OF THE INVENTION

The present invention relates generally to computer networks, and more specifically to management of nodes in private network clustering environments.

BACKGROUND

A computer network is a group of computers, printers, and other network devices linked together by a communication system. Computer networks allow devices within the network to transfer information between one another. A computer network can be a very small, such as two network devices coupled together in close proximity to each other, or extremely large, such as thousands of interconnected network devices spanning the entire globe.

As a computer network grows in size, the ability to efficiently manage the network becomes increasingly difficult. In a large network, also referred to as a wide area network (WAN), the number of devices connected to the network may constantly change. Networking equipment may fail, causing bottlenecks or traffic diversions in the system. Expansions may require higher bandwidth capabilities in certain portions of the network. A network administrator must keep track of such changes and respond accordingly in order to maintain the computer network in proper working order.

One method of organizing a computer network is to arrange network devices, also referred to as nodes, into node clusters or node groups. Node clusters are composed of two or more nodes and are typically created to handle different resources in the network system. For example, one node cluster may be responsible for transferring data files while another node cluster may handle a site's e-mail services. Node clusters also help coordinate and distribute network traffic so that no one node becomes overloaded.

Since each node cluster member typically performs the same set of tasks as the other nodes in the node cluster, it is often desirable to perform the same management operations on all or many of the node cluster members at the same time. One difficulty in performing the same management operations on many node cluster members at the same time is that a network administrator may not always know which nodes are members to particular node cluster. Thus, a network administer may be required to spend time investigating exactly which nodes belong to the node cluster. Further complicating a network administrator's desire service multiple nodes in a node cluster is that not every node cluster member may have the same network connectivity. Therefore, the administrator may be faced with a situation where not every node in a node cluster can be serviced from a particular network location. These and other difficulties may require a network administrator to expend considerable time and effort servicing node clusters.

SUMMARY OF THE INVENTION

The present invention addresses the above-mentioned limitations of traditional computer network management systems by providing a single system image of a node cluster to the network manager. This arrangement enables the node cluster to be managed remotely by communicating with any one of the node cluster members, thereby greatly simplifying management tasks.

Thus, an aspect of the present invention involves a method for a management station to manage a node cluster in a computer network, wherein the node cluster includes a plurality of servant nodes, a target node and a master node. The method comprises a receiving step for receipt of a management command from the management station through the network by the target node. A sending operation sends the management command to the master node from the target node. A processing step processes a management response to the management command by the master node. Next, a sending step sends the management response to the target node from the master node, and another sending operation sends the management response to the management station by the target node.

Another aspect of the invention is a management agent for processing management commands from a management station. The management agent includes a receiving module and a sending module. The receiving module is configured to receive management data requested from the node members. The receiving module is also configured to communicate management commands from the target node to the master node. The sending module is configured to send management data from the node members and to communicate a command response from the master node to the target node.

Yet another aspect of the invention is a system for processing a management command issued from a management station. The system includes a node cluster with a plurality of servant nodes and a master node. A target node belonging to the node cluster receives the management command issued from the management station. A master management agent executes on the master node, and is configured to process the management command and send a command response to the target node. A target management agent also executes on the target node, and is configured to forward the management command to the master node and send the command response to the management station.

A further aspect of the invention is a computer program product embodied in a tangible media for managing a node cluster in a computer network by a management station. The computer program performs the operations of: receiving a management command from the management station through the network by the target node; sending the management command to the master node from the target node; processing a management response to the management command by the master node; sending the management response to the target node from the master node; and sending the management response to the management station by the target node.

The foregoing and other features, utilities and advantages of the invention will be apparent from the following more particular description of various embodiments of the invention as illustrated in the accompanying drawings.

DETAILED DESCRIPTION OF THE INVENTION

The invention is described herein with reference to FIGS. 1-5. When referring to the figures, like structures and elements shown throughout are indicated with like reference numerals.

As detailed below, the present invention is designed to facilitate management of a cluster of nodes in a computer network. The invention beneficially masks the complex interconnections within the node cluster from the management station by representing the node cluster as a single node or a single system image (SSI). Such an arrangement allows the node cluster to be managed remotely by accessing any of the node cluster members, thereby greatly simplifying management tasks.

Figure 1:
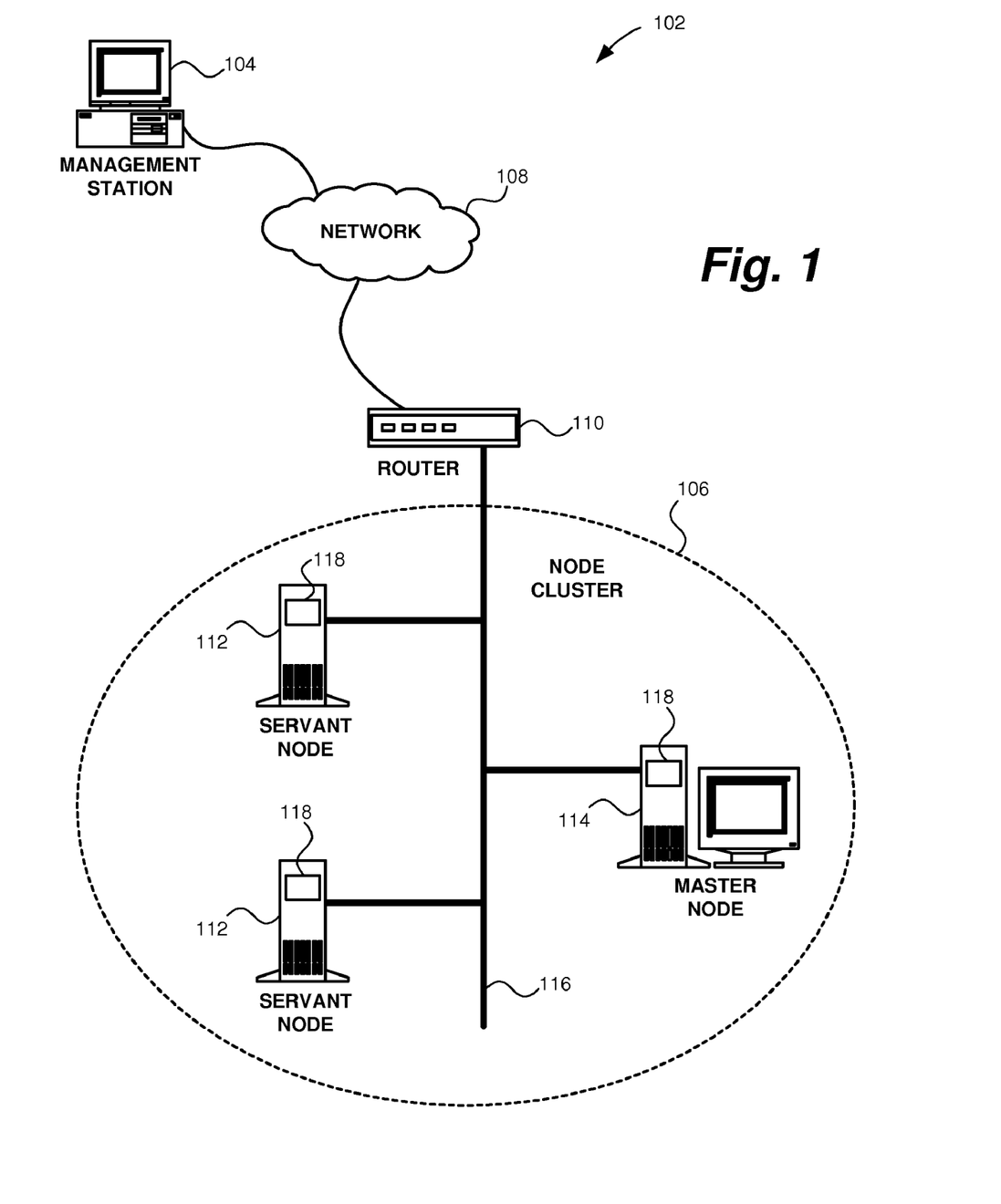
FIG. 1 shows an exemplary network environment embodying the present invention.

In FIG. 1, an exemplary network environment 102 embodying the present invention is shown. The network environment 102 includes a management station 104 communicating with a node cluster 106 via a computer network 108. The management station 104 represents a network client with the capability of performing one or more network management tasks. Typically, the management station 104 is a computer used by a network administrator to manage the systems in the network environment 102. For example, the management station may query the number of packets sent and received by the node(s), the number of connections made by the node(s), and so on. The communication path between the management station 102 and the node cluster 106 may include a variety of networking devices known to those in the art, such as routers 110, repeaters, hubs, switches, bridges, etc.

The node cluster 106 comprises several servant nodes 112 and a master node 114 connected by a private network 116. As used herein, a node cluster is a group of nodes selected to appear as a single entity. The nodes selected to be part of the cluster may be selected for any reason. Furthermore, the node cluster members many not necessarily be physically located close to one another or share the same network connectivity. Every servant node 112 in the cluster 106, however, must have connectivity to the master node 114 via the private network 116. A private network generally refers to a local area network (LAN) connection shared by all the nodes participating in the node cluster and not accessible by other devices in the network. It is envisioned that a node cluster 106 may contain as many nodes as required by the system. In practical applications, however, a maximum number of nodes may be determined by limits in functional performance. For example, in some applications it may be the case that the performance of a node cluster 106 beyond twenty (20) nodes begins to degrade in performance.

As discussed in detail below, the master node 114 is responsible for processing management station requests received by any node cluster member. Although any node in the node cluster with connectivity to all the cluster members may be selected as the master node 114, the node offering the highest availability in the cluster is typically selected as the master node 114. It is contemplated that backup master nodes many be selected in case the master node 114 fails. For purposes of simplicity, however, selection of the master node 114 is assumed to be arbitrary.

Each node in the node cluster 106 includes a management agent 118 that handles management requests received from the management station 104. As explained below, the management agent 118 on each node passes received management requests from the management station 104 to the master node 114. The management agent 118 running on the master node 114 then processes the management request. Once the request is processed, the master node 114 sends the response to the original node that received the management request. The original node then forwards the response to the management station 104. In one embodiment of the invention, the management agent 118 includes a gateway for Protocol Data Units (PDUs) formatted under a Simple Network Management Protocol (SNMP) standard. It is contemplated that other system management standards known to those skilled in the art, such as Common Information Model (CMI), Common Management Information Protocol (CMIP), and System Network Architecture-Management Service (SNA-MS), may be used by the present invention.

Figure 2:
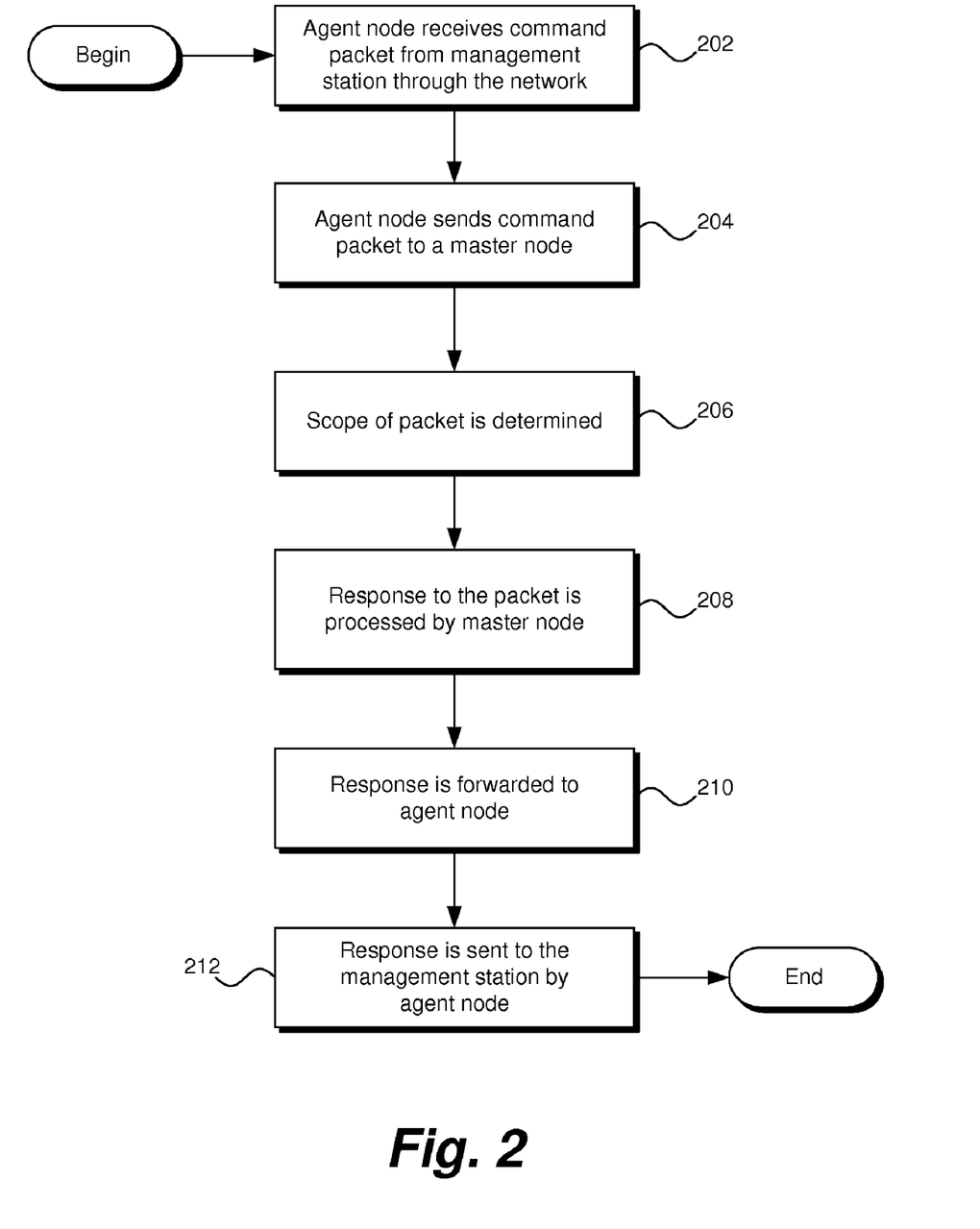
FIG. 2 shows a flowchart showing operations performed by management agents.

In FIG. 2, a flowchart containing operations performed by the management agent, as contemplated by the present invention, is shown. It should be remarked that the logical operations of the management agent may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

Operation flow begins with receiving operation 202, in which a target node receives a management command packet from the management station. As used herein, a target node is the node in the node cluster that the command packet from the management station is addressed to. The target node may be a servant node or a master node. In one embodiment of the invention, SNMP is utilized to send management request commands to the nodes. For instance, SNMP allows the management station to query a node's status by sending a "Get" or "Get-next" command. After the target node receives the management command, control passes to sending operation 204.

In sending operation 204, the management command packet is forwarded to the master node. Thus, rather than processing the management command, the target node sends the management command to the master node. The exact communications mechanism used to transfer the management command from the target node to the master node is not of particular importance, and thus may be realized using any method known to those skilled in the art. For example, in one implementation of the present invention, a remote procedure call (RPC) is used to communicate the management command between nodes. After the sending operation 204 is completed, control passes to determining operation 206.

At determining operation 206, the master node receives the management command from the target node and determines the scope of the information required by the management station. For each management request issued by the management station, a decision is made about how to best represent the data returned to the management station in the command response. The master node must consider what the response data represents. That is, whether the data represents information about a node, multi-node, Virtual File Server (VFS), or other entity. This representation is also referred to herein as the scope of the information. Once the scope of the request is determined, control passes to processing operation 208.

In processing operation 208, the master node executes the necessary directives and performs the necessary processing to compose a response to the management command. The type of management command and its scope dictates the actions taken by the master node. The actions taken by the master node may include, for example, communicating with the target node that received the management command packet, communicating with other servant nodes, and compiling and formatting information into a response. After processing operation 208 ends, control passes to forwarding operation 210.

In forwarding operation 210, the master node forwards the composed response to the target node. Again, the communication mechanism used to transfer the response from the master node to the target node is not critical. In one embodiment of the invention, an RPC is used to transfer the response from the master node to the target node.

Next, in sending operation 212, the target node sends the response back to the management station. The target node sends the response to the management station in the protocol expected. Thus, if SNMP was used to issue the management command, the response is sent using SNMP. Once the target node issues the response to the management station, operation flow ends.

In accordance with the present invention, the operations performed by the management agents can be a computer readable program embodied as computer readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the management agents. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
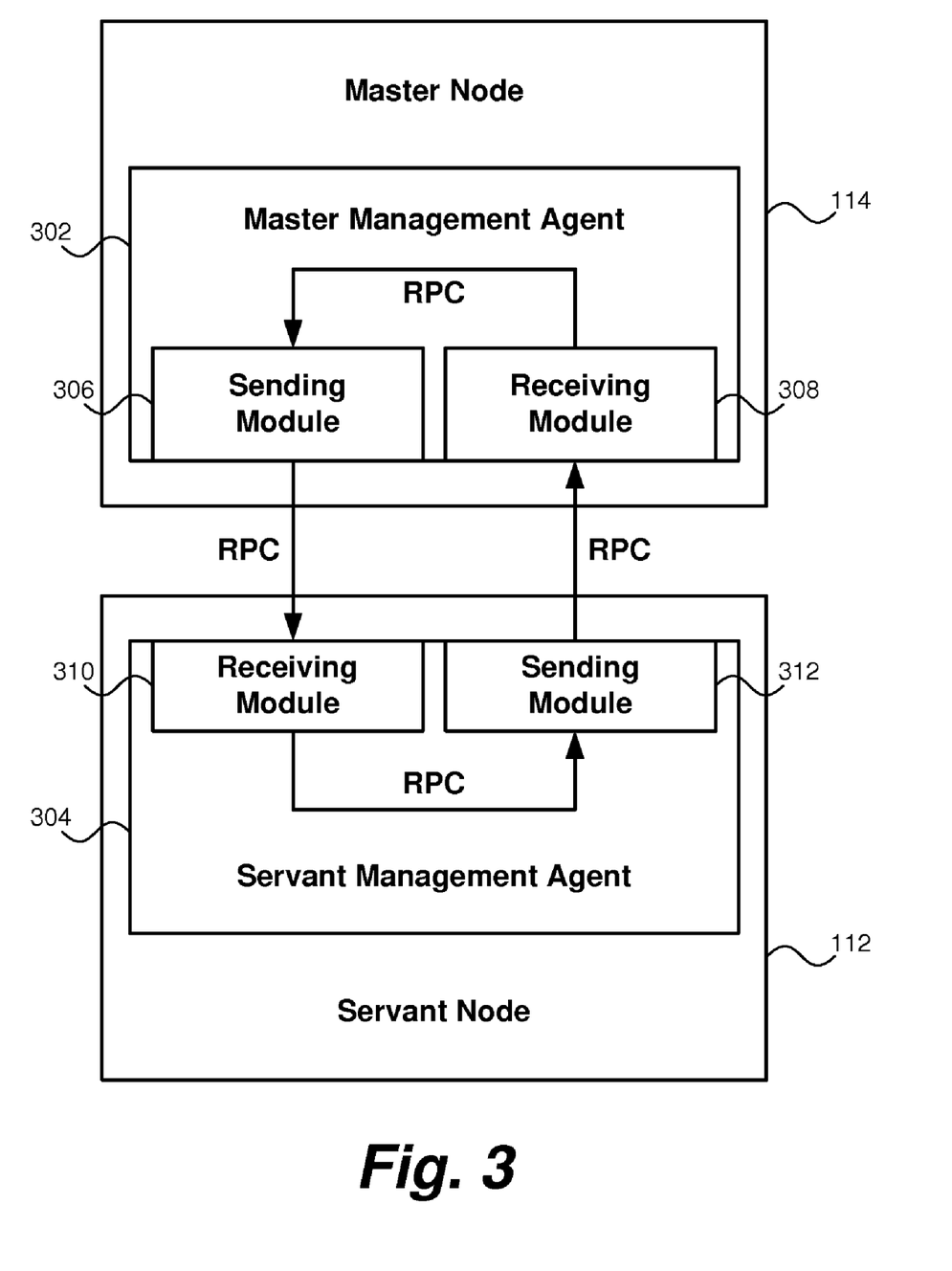
FIG. 3 shows an exemplary system implementing the present invention.

In FIG. 3, an exemplary system implementing the present invention is shown. The system comprises of a master node 114 communicating with a servant node 112 in a node group. The master node 114 includes a master management agent 302 and the servant node 112 includes a servant management agent 304.

The master management agent 302 is split into two parts: a sending process 306 and a receiving process 308. The sending process 306 is responsible for communicating information requests to servant nodes 112 in the node group according to the scope of the received management command. Furthermore, the sending process 306 passes the command response to the target node that originated the management command. In a particular embodiment of the invention, the sending process 306 communicates with servant management agents 304 using RPC technology.

The receiving process 308 of the master management agent 302 obtains data requested from the servant nodes 112. The receiving process 308 is also utilized to obtain the management command from the target node. As mentioned above, in one embodiment of the invention the receiving process 308 includes an SNMP PDU gateway.

The servant management agent 304 is also split into a receiving process 310 and a sending process 312. The receiving process 310 receives requests issued from the sending process 306 of the master management agent 302, and may also include an SNMP PDU gateway. Once the request is obtained, the servant management agent 304 retrieves the necessary data and forwards it to the receiving module 308 of the master management agent 302 via its sending process 312. It is envisioned that communication of data between the receiving process 310 and the sending process 312 of the servant management agent 304 may also be accomplished utilizing RPC technology. If the servant node 112 is also the target node, then the receiving process 310 is additionally configured to obtain the command response from the master node 114 and the sending process 312 is additionally configured to send the command response to the management station, as described below.

Figure 4:
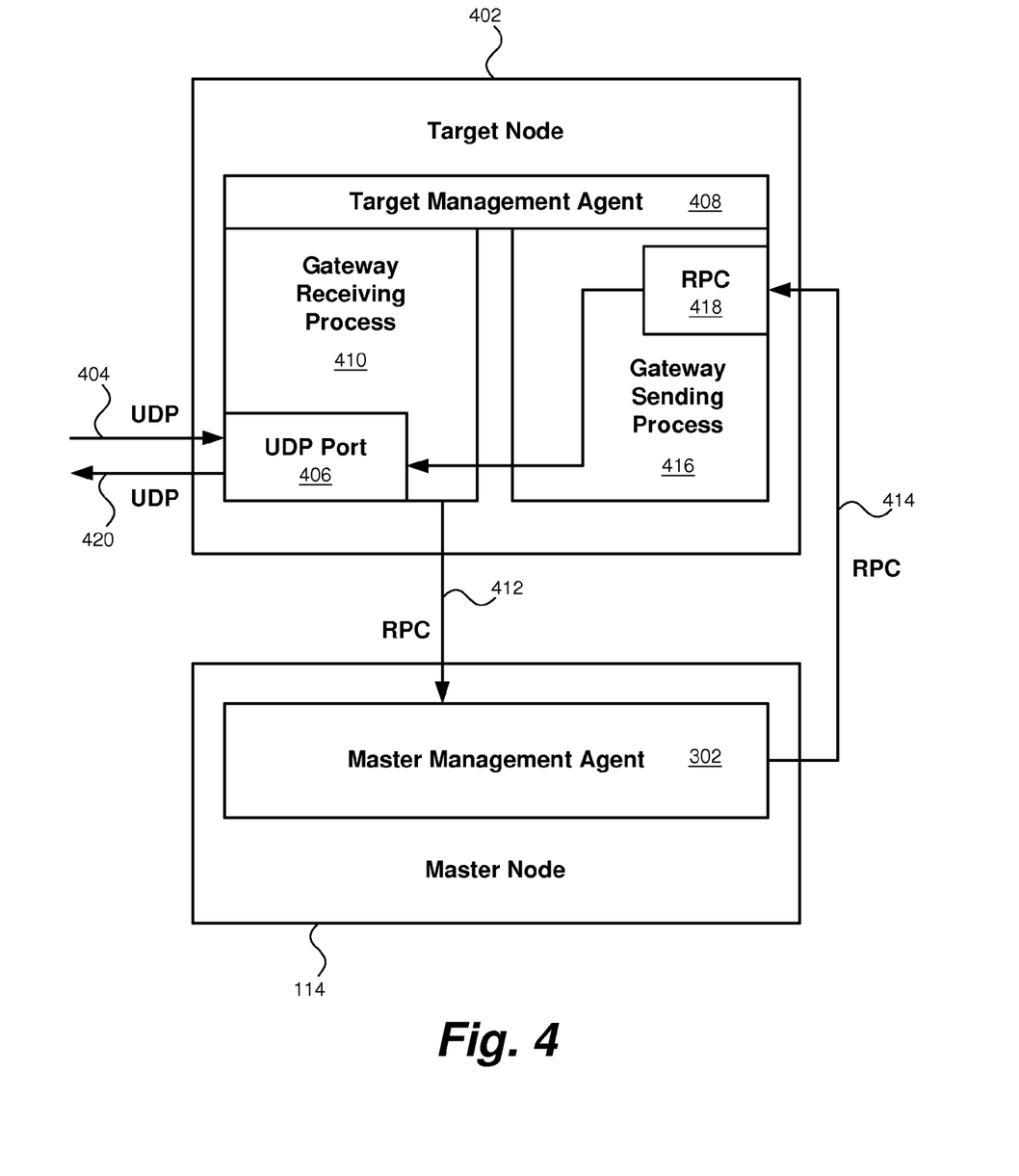
FIG. 4 shows another configuration of the present invention.

In FIG. 4, another system configuration of the present invention is shown. The system includes a target node 402 that receives management commands 404 from the management station. In one embodiment of the invention, the management commands 404 are formatted under a User Datagram Protocol (UDP) and are received by the target node 402 through a UDP port 406. It is contemplated that other management command protocols may be utilized by the present invention.

The UDP port 406 informs the target management agent 408 running on the target node 402 that a management command has been received. The target management agent 408, in turn, initiates a gateway receiving process 410 which forwards the management command to a master management agent 302 executing on the master node 114.

The management command may be forwarded to the master management agent 302 by means of, for example, an RPC 412. In one embodiment of the invention, the target management agent 408 and the master management agent 302 are SNMP agents. Furthermore, if the master node 114 is also the target node 402, then the RPC results in calling the SNMP agent on the same node.

As discussed above, the master management agent 302 receives the management command and constructs an appropriate command response. This process may include polling servant nodes in the node cluster for data, accessing stored data, and compiling the data. Once a command response is prepared, the master management agent 302 sends the response to the target management agent 408 of the target node 402. In one embodiment of the invention, the response is sent from the master management agent 302 to the target management agent 408 using an RPC 414.

The target management agent 408 initiates a gateway sending process 416 after the target agent 302 receives the command response. In a particular embodiment of the invention, an RPC server port 418 is used to receive the command response. The gateway sending process 416 passes the command response to the UDP port 406 and may also format the command response to an appropriate protocol.

Once the command response is passed to the UDP port 406, the target node 402 sends the response 420 back to the management station. It is contemplated that the command response 420 may be formatted as a UDP packet. Thus, the system described above beneficially allows a network manager to issue management commands and queries to a single node in a node group, while still maintaining a single system image at the node cluster.

Figure 5:
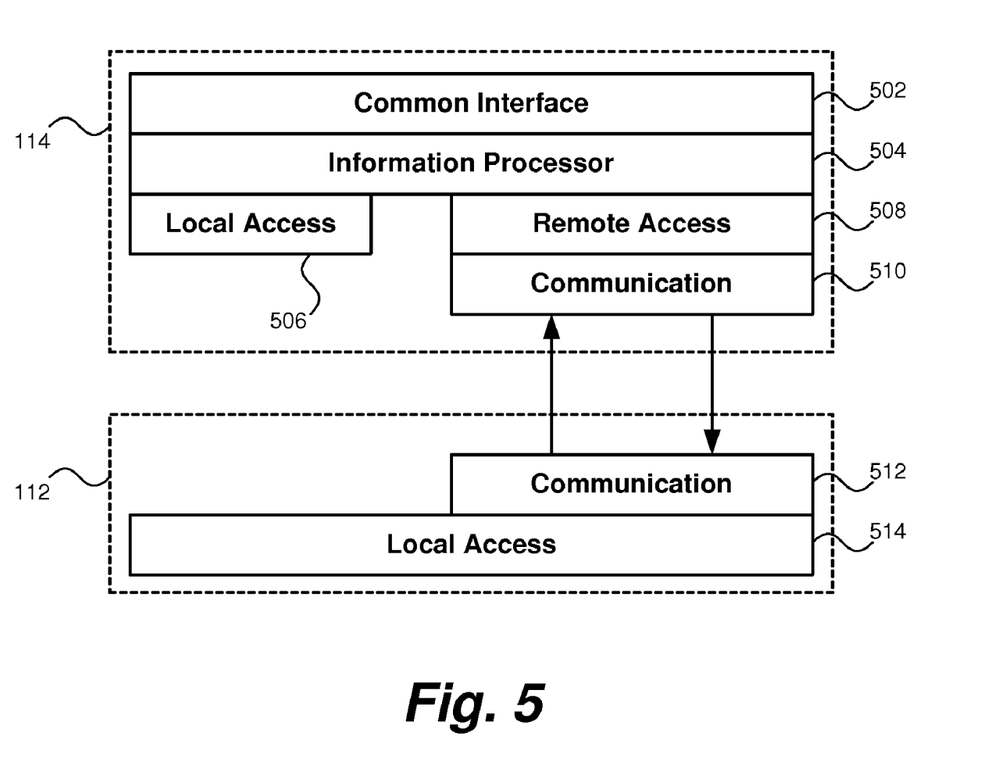
FIG. 5 shows the functional blocks used to compose a response by a master node to a management command.

As discussed above, once the master node receives a management command, the master node composes a response. In FIG. 5, exemplary functional blocks used to compose a response by a master node 114 are shown. It should be noted that the functional blocks presented may be implemented in hardware, software, or a combination thereof, depending on the performance requirements of the user.

The master node 114 includes a common interface 502 which comprises routines, protocols, and other tools for interacting with software executed by the master node 114. In one embodiment of the present invention, a common application program interface (C-API) is used as the common interface 502.

The common interface 502 is coupled with an information processor 504. The information processor 504 is used to collect and process data from node cluster members. The information processor 504 is also responsible for formatting and arranging data in the manner expected by the management station. Thus, the information processor 504 is aware of the scope of the information required from the management system and constructs a response to the management command accordingly. It is contemplated that a lookup table may be used to determine the type of data required for each management command.

Coupled to the information processor 504 are a local access module 506 and a remote access module 508. The local access module 506 is utilized when local data access is needed to construct or perform a response to the management command. For instance, if, as part of the response, the master node 114 is required to provide its own serial number to the management station, the local access module 506 is used to acquire the master node's serial number. In one embodiment of the invention, a node's local data is represented by a management information base (MIB). The local access module 506 obtains local data from the node by retrieving an object instance represented by the MIB. Likewise, the local access module 506 may set local data by modifying an object instance in the MIB.

When data access from servant nodes is required by the master node 114, the remote access module 508 is used to access such information. Furthermore, the remote access module 508 is used in conjunction with a communication module 510. The communication module 510 includes routines to format and transmit information, as well as data compression and error correction routines. It is contemplated that any node-to-node communication mechanism could be used by the communication module 510.

As described above, in one embodiment of the invention, access to remote nodes is achieved using a remote procedure call (RPC). An RPC allows the master node 114 to execute a function on a servant node 112 and obtain the results of the function. Specifically, the remote access module 508 associates a functional call on the servant node 112 with a particular management command. The remote access module 508 passes the function call, along with the proper function parameters, to the communication module 510. The communication module 510 then calls the function in the servant node 112 and awaits the result. Once the result arrives, the communication module 510 utilizes conversion routines to retrieve the information formatted in external data representation (XDR).

A servant node 112 also includes a communication module 512 and a local access module 514. The communication module 514 is used to format and transmit information, compress data, and correct errors. When a command is issued from the master node 114 is received by the communication module 512, the local access module 514 is used to obtain a response. Once the response is encode by the local access module 514, it is sent to the master node 114 by the communication module 512.

It should be apparent to those skilled in the art that the above-described invention assists in node cluster management by providing a means of representing the node cluster as a single system image (SSI). The invention allows management control of the entire node cluster by accessing any of the node cluster members. Such an arrangement simplifies management tasks and reduces the effort required in servicing network node clusters.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A management agent embodied in a non-transitory tangible medium for processing management commands from a management station, the management agent being suitable for execution in a node cluster, where the node cluster includes a plurality of node members, the node members including a master node, a target node and a plurality of servant nodes, the management agent comprising:
    a receiving module configured to receive management data requested from the node members, the receiving module being further configured to communicate management commands from the target node to the master node, the target node being one of the plurality of servant nodes in the node cluster; and
    a sending module configured to send management data from the node members, the sending module being further configured to communicate a command response from the master node to the target node; and
    wherein any of the plurality of servant nodes can be the target node to forward the management command from the management station to the master node and send the command response from the master node to the management station.

2. The management agent of claim 1, further comprising an information processor configured to format the command response in a manner expected by the management station.

3. The management agent of claim 1, further comprising a local access module configured to obtain local node data.

4. The management agent of claim 1, further comprising a remote access module configured to obtain node data from another node member.

5. The management agent of claim 1, further comprising a common interface configured to interact with software executed by the node members.

6. A system for processing a management command issued from a management station, the system comprising:
- a node cluster, the node cluster including a plurality of servant nodes, a master node and a plurality of servant nodes, the node cluster appearing as a single entity to the management station;
- a target node belonging to the node cluster, wherein the target node receives the management command issued from the management station, the target node being one of the plurality of servant nodes in the node cluster;
- a master management agent executing on the master node, the master management agent configured to process the management command and send a command response to the target node; and
- a target management agent executing on the target node, the target management agent configured to forward the management command to the master node and send the command response to the management station; and
- wherein any of the plurality of servant nodes can be the target node to forward the management command from the management station to the master node and send the command response from the master node to the management station.

7. The system of claim 6, wherein the node cluster further comprises a local network connecting the servant nodes with the master node.

8. The system of claim 6, wherein the master management agent further comprises:
- a receiving module configured to receive the management command from the target node; and
- a sending module configured to send the command response from the master node to the target node.

9. The system of claim 8, wherein the master management agent includes an information processor configured to format the command response in a manner expected by the management station.

10. The system of claim 8, wherein the master management agent includes a local access module configured to obtain node data from the master node.

11. The system of claim 8, wherein the master management agent includes a remote access module configured to obtain node data from the servant nodes.

12. The system of claim 8, wherein the master management agent includes a common interface configured to interact with software executed on the master node.

13. The system of claim 6, wherein the target management agent further comprises:
- a receiving module configured to receive the management command from the management station and the command response from the master node; and
- a sending module configured to send the management command to the master node and the command response to the management station.

14. The system of claim 13, wherein the target management agent includes a local access module configured to obtain node data from the target node.

15. A computer program product embodied in a tangible medium comprising:
- computer readable program codes coupled to the tangible medium for managing a node cluster in a computer network by a management station, the node cluster including a plurality of servant nodes, a target node and a master node, the node cluster appearing as a single entity to the management station, the computer readable program codes comprising:
- first computer readable program code configured to cause the program to receive a management command from the management station through the network by the target node, the target node being one of the plurality of servant nodes in the node cluster;
- second computer readable program code configured to cause the program to send the management command to the master node from the target node;
- third computer readable program code configured to cause the program to process a management response to the management command by the master node, wherein processing the management response includes polling the servant nodes for data required by the management command;
- fourth computer readable program code configured to cause the program to send the management response to the target node from the master node; and
- fifth computer readable program code configured to cause the program to send the management response to the management station by the target node; and
- wherein any of the plurality of servant nodes can be the target node to forward the management command from the management station to the master node and send the command response from the master node to the management station.

16. The computer program product of claim 15, further comprising sixth computer readable program code configured to cause the program to determine the scope of the management command.

17. The computer program product of claim 15, further comprising sixth computer readable program code configured to cause the program to poll the servant nodes for data required by the management command.

18. The computer program product of claim 15, further comprising sixth computer readable program code configured to cause the program format the management response to the protocol expected by the management station.

* * * * *